BEST AVAILABLE COPY

June 9, 1925.

Re. 16,093

T. F. WILSON

CRANK CASE ARM

Original Filed Dec. 18, 1919

Witness:
Harry S. Gaither

Inventor:
Thomas F. Wilson
by Wallace R. Lane
Atty.

BEST AVAILABLE COPY

Reissued June 9, 1925.

Re. 16,093

UNITED STATES PATENT OFFICE.

THOMAS FORD WILSON, OF CRANSTON, RHODE ISLAND.

DESIGN FOR A CRANK-CASE ARM.

Original No. 58,397, dated October 11, 1921, Serial No. 345,901, filed December 18, 1919. Application for reissue filed June 9, 1923. Serial No. 6,454. Term of patent 14 years.

*To all whom it may concern:*

Be it known that I, THOMAS F. WILSON, a citizen of the United States, residing at Cranston, in the county of Providence and State of Rhode Island, have invented a new, original, and ornamental Design for Crank-Case Arms, of which the following is a specification, reference being had to the accompanying drawing, forming part thereof.

Figure 1:
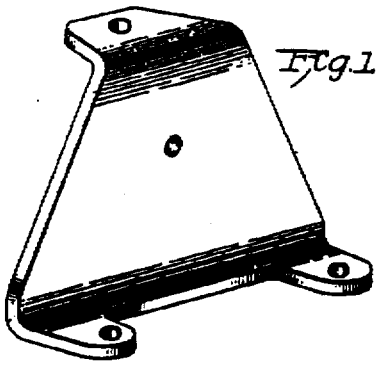
Fig. 1 is a perspective view showing my invention.
Figure 2:
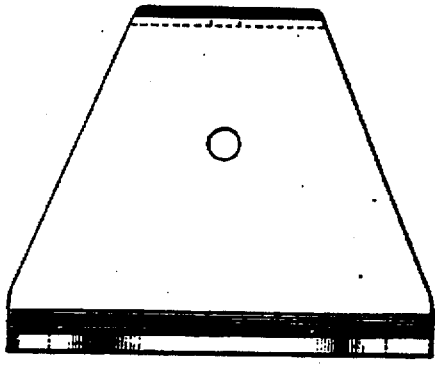
Fig. 2 is a side face elevation thereof.
Figure 3:
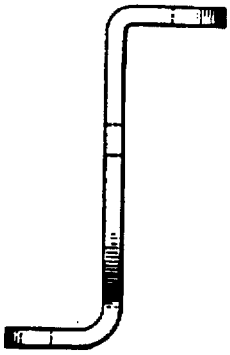
Fig. 3 is an edge view thereof.

I claim:

The ornamental design for a crank case arm, as shown.

THOMAS FORD WILSON.